United States Patent [19]

Buckmaster et al.

[11] Patent Number: 4,764,538

[45] Date of Patent: Aug. 16, 1988

[54] FOAM NUCLEATION SYSTEM FOR FLUOROPOLYMERS

[75] Inventors: Marlin D. Buckmaster, Vienna, W. Va.; Stuart K. Randa, Wilmington, Del.

[73] Assignee: E. I. Du Pont de Nemours and Company, Wilmington, Del.

[21] Appl. No.: 134,164

[22] Filed: Dec. 16, 1987

[51] Int. Cl.[4] ................................................. C08J 9/04
[52] U.S. Cl. ........................................ 521/85; 521/89; 521/92; 521/145
[58] Field of Search ...................... 521/85, 89, 92, 145

[56] References Cited

U.S. PATENT DOCUMENTS 3,072,583  1/1963  Randa ................................. 260/2.5
3,253,065  5/1966  Hansen ................................. 264/47
4,650,815  3/1987  Namba et al. ........................ 521/77

FOREIGN PATENT DOCUMENTS 59-11340  1/1984  Japan .

Primary Examiner—Morton Foelak

[57] ABSTRACT

This invention relates to foamable melt processible fluoropolymer resins containing boron nitride and one or more of a class of inorganic salts which significantly enhance foam nucleation (as evidenced by small foam cell size).

6 Claims, 2 Drawing Sheets

Fig. I
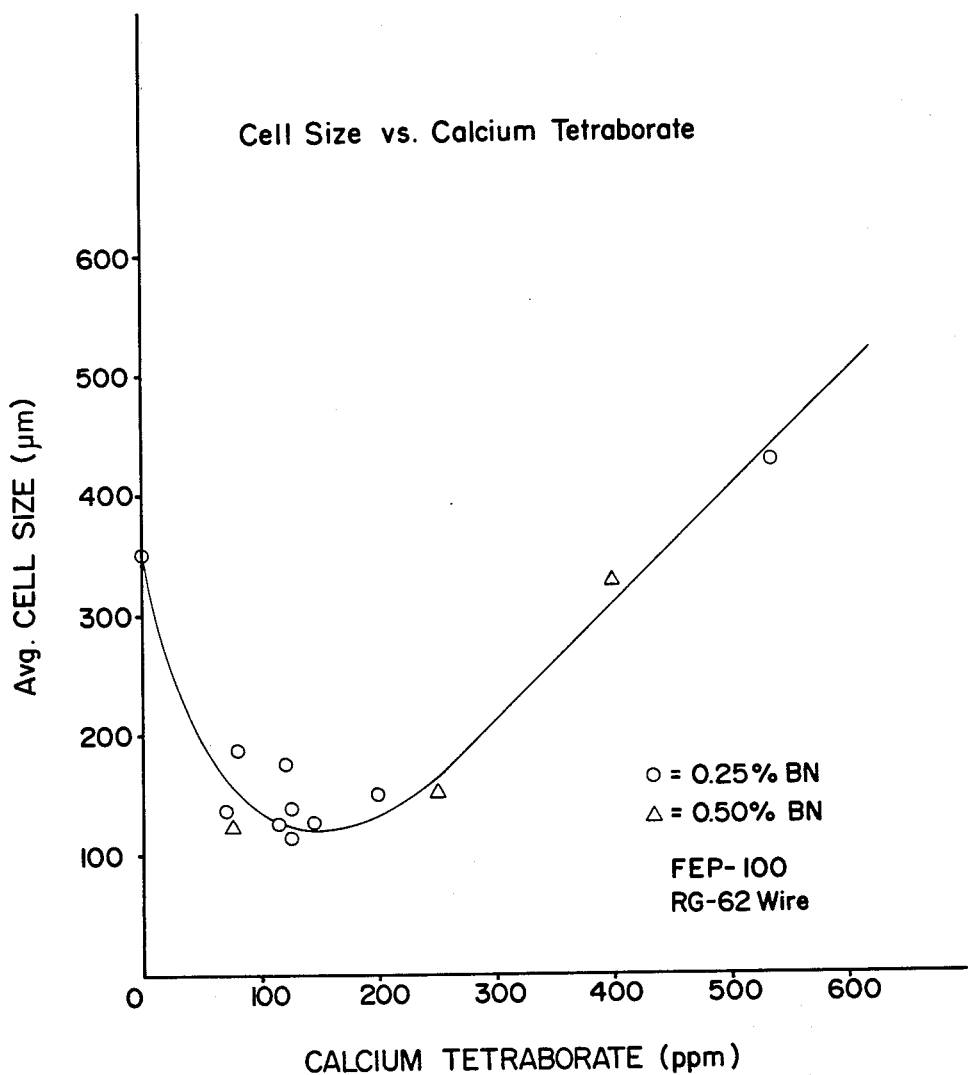

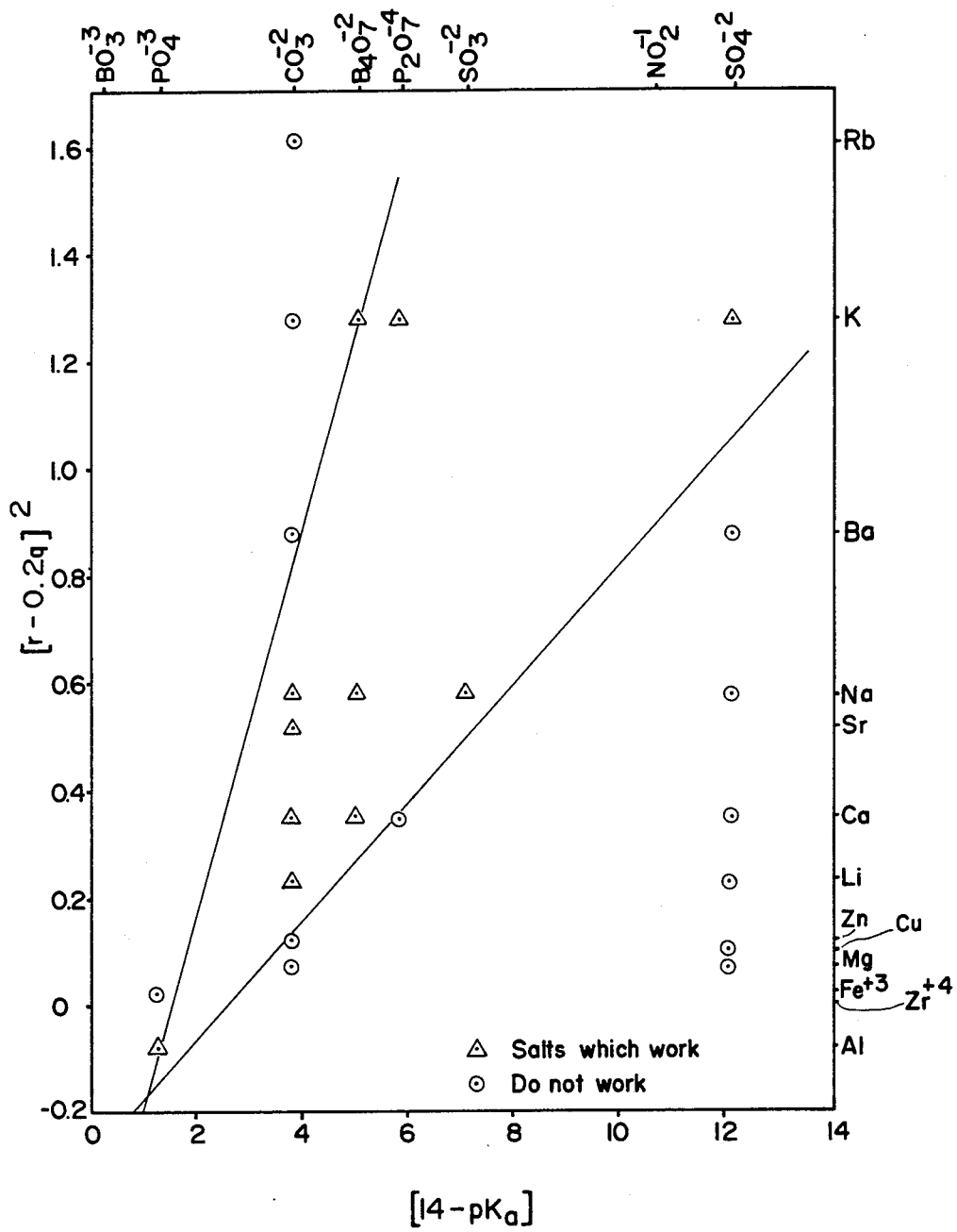
Fig. II

FOAM NUCLEATION SYSTEM FOR FLUOROPOLYMERS

FIELD OF THE INVENTION

This invention relates to the use of a class of inorganic salts in combination with boron nitride to give an improved nucleation system for dissolved gas foaming of melt extrudable fluoropolymer resins.

BACKGROUND OF THE INVENTION

Conductive wire is often used to transmit electronic signals. The wire must be protected, or insulated, and thermoplastic coatings are ordinarily used for this. The thermoplastic is extruded from a molten state onto and around the wire. The thermoplastic materials are selected on the basis of having a low dielectric constant and a low dissipation factor. It has previously been found that if the thermoplastic is foamed as it is applied to the wire, the dielectric constant is desirably lowered, due to the formation of numerous small noninterconnected cells in the foam. Foamed insulation around transmission wire is described in U.S. Pat. No. 3,072,583 which describes a nucleated foaming process for extruding perfluorinated polymer foam with a dissolved gas blowing agent.

Boron nitride has been the nucleating agent of choice in most commercial applications for fluoropolymer foams. Besides nucleating foam cells, boron nitride is attractive because it is thermally stable, chemically inert, has excellent electrical properties (at 1% loading there is very little change in dissipation factor or dielectric constant due to the boron nitride), is white and has low toxicity. It is, however, very expensive. The compositions of this invention, fluoropolymers containing synergistic combinations of boron nitride and certain inorganic salts, give greatly enhanced foam nucleation. This not only allows a significant reduction in the amount of costly boron nitride needed but also gives improved foam in terms of smaller cells. Better capacitance and diameter uniformity are also attained.

The compositions of this invention are useful in producing foams for other applications as well. For example foamed sheet for electrical insulation or heat insulation, or cushioning, and foamed pipe or tubing and the like.

SUMMARY OF THE INVENTION

This invention relates to foamable melt processible fluoropolymer resin compositions containing boron nitride and one or more of a class of inorganic salts which significantly enhance foam nucleation (as evidenced by small foam cell size). Preferably the compositions will contain 0.02 to 2.0 weight percent, preferably 0.05 to 1.0 weight percent boron nitride and 25 to 1000 ppm by weight of one or more of the specified salts. Preferably also the fluoropolymer resin will contain at least 35 weight percent fluorine.

It has been discovered that the effective salts are ones having a certain relationship between the radius of the cation, the valence of the cation, and the acid strength of the protonated anion. More specifically the inorganic salts of this invention are salts which are thermally stable at the polymer extrusion temperature, have metal cations and polyatomic anions (two or more atoms) and satisfy the following relationship:

$$0.36 \times [14-pKa] - 0.52 \geq [r - 0.2 \cdot q]2 \geq 0.11 \times [14-pKa] - 0.28$$

where
- r = crystal ionic radius of the cation, in Angstroms
- q = valence of the cation
- pKa = −log of Ka (the equilibrium constant for the following reaction)

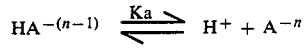

where
A is the salt anion, H is hydrogen, and n = the absolute value of the valence of the anion.

The term $0.36[14-pKa] - 0.52$ is the equation of the upper boundary line of FIG. II (explained below) and $0.11[14-pKa] - 0.28$ is the equation for the lower boundary line.

The empirical relationship can best be explained by referring to FIG. II. The ordinate is calculated from known constants for each cation, the ionic radius and the valence. Thus all Na salts are on one horizontal line. The abscissa is calculated from the last ionization constant of the acid corresponding to a particular anion. For example, in the case of carbonate, the constant pKa is for the dissociation of $HCO_3^-$ to $H^+$ and $CO_3^{--}$. Thus all carbonate salts are on one vertical line.

Carbonates which fall above the upper line (Ba, K, and Rb) are ineffective, and carbonates which fall below the lower line (Mg and Zn) are also ineffective. However, those carbonates which fall between the two lines are effective (Li, Ca, Sr, and Na).

In general, all salts that fall between the two lines are effective, while those that fall outside that area are not effective. Stated another way, salts of a given cation are effective if the anion has a suitable ionization constant, pKa; if the anion has too low or too high an ionization constant, the salt will not be effective.

DESCRIPTION OF THE DRAWINGS

FIG. I is a graph depicting the much reduced foam cell size when the salt calcium tetraborate is added to a boron nitride/fluoropolymer composition. The figure is described in Example 1 below.

FIG. II is a graph depicting the boundaries of the formula used to define the useful salts.

DESCRIPTION OF THE INVENTION

The fluoropolymer resins useful in the present invention are organic polymeric compounds containing at least 35 weight percent of fluorine and having a melt flow rate (g/10 min) of about 1 to about 100 as measured according to ASTM D 1238.

Preferred examples of such fluoropolymer resins are:
(a) homopolymers of chlorotrifluoroethylene or 2,2-difluoroethylene,
(b) copolymers of tetrafluoroethylene and one of the above monomers in (a) or
(c) copolymers of at least one of the above monomers (a) or (b) and one or more monomers selected from the group consisting of ethylene, terminally unsaturated perfluoroalkylene of 3–8 carbon atoms, perfluoro(alkyl vinyl ether) of 3–8 carbon atoms, oxy-containing perfluoro(alkyl vinyl ether) of 5–12 carbon atoms, and perfluoroalkyl ethylene of 3–8 carbon atoms.

Especially preferred examples are: tetrafluoroethylene/hexafluoropropylene; tetrafluoroethylene/perfluoro(propyl vinyl ether); ethylene/tetrafluoroethylene/perfluorobutyl ethylene; ethylene/chlorotrifluoroethylene; and polyvinylidene fluoride.

Fluoropolymer foamed wire insulation is generally produced by a continuous gas injection process using chlorodifluoromethane, nitrogen, carbon dioxide or other appropriate gases, using an extruder screw designed for foam operations, and using boron nitride as a nucleating agent. Foaming can be achieved using chlorodifluoromethane, a commercially available gas, as a blowing agent. Similar results can be obtained using nitrogen or a neon-helium 3:1 mixture. The chlorodifluoromethane is dissolved in the molten resin inside the extruder. Absorption follows Henry's Gas Law. This law states, "The equilibrium value of the mole fraction of gas dissolved in a liquid is directly proportional to the partial pressure of the gas above the liquid surface." Therefore, simply by adjusting the gas pressure in the extruder, the amount of chlorodifluoromethane dissolved in the melt can be controlled. Generally, the greater the amount of gas dissolved in the melt, the greater the void volume in the foam.

Chlorodifluoromethane is especially suited for foaming because it easily dissolves in the molten fluoropolymer resins, and its thermal stability is adequate to survive the holdup time in the extruder when mixed with molten resin at temperatures up to 380° C.

Foam cell formation actually starts shortly after the molten resin containing the blowing agent passes out of the extrusion die. The chlorodifluoromethane dissolved in the molten resin comes out of solution because of the sudden drop in melt pressure as the extrudate exits the extrusion die. Melt draw assists foam nucleation. Foam cell growth is stopped and the polymer solidified when the extrudate enters water in a cooling trough.

A nucleating agent is needed to achieve uniform, small diameter cell structure. A preferred nucleating agent for fluoropolymer resins is boron nitride, an inert white ceramic powder. A 0.5-2.0% weight loading of boron nitride based on polymer normally provides adequate foam cell nucleation. The lower the specific gravity of the molten resin, the more nucleant is needed on a weight basis. Thus a copolymer of ethylene and tetrafluoroethylene with a melt specific gravity of about 1.3 requires more nucleant than a copolymer of tetrafluoroethylene and hexafluoropropylene at a melt specific gravity of 1.6. This final 0.5-2.0% concentration in the foaming process can be achieved by blending a cube concentrate resin containing 5% boron nitride with unfilled resin. A cube blend of 1 part concentrate to 9 parts unfilled resin will approximate a 0.5% loading, and 1 part concentrate to 4 parts resin will give 1.0% loading. Such concentrate resins are available commercially. A preferred boron nitride is one produced by Carborundum Corporation having a surface area of about 8 square meters per gram. It was used in most of the examples herein.

The optimum boron nitride concentration depends on the foam construction being produced, the specific resin being used and the type of boron nitride used, but generally about 1% by weight is optimum for tetrafluoroethylene/hexafluoropropylene (TFE/HFP) copolymer.

With the salts used in this invention, a boron nitride concentration in the range of 0.05 to 1.0% by weight is normally used. Since boron nitride costs $50-65/lb, at present, this gives a very substantial cost savings.

The salts used in this invention appear to interact with boron nitride to form nucleation sites. The effectiveness depends on an optimum level of interaction. Some salts seem to interact too strongly whereas others apparently have little or no interaction, i.e. some salts have essentially no affect on nucleation. Some are quite detrimental, leading to fewer and larger foam cells. The salts which are effective, and which are useful in this invention, are inorganic salts which are stable at the temperature of extrusion, which have polyatomic anions (two or more atoms) and which satisfy the following relationship:

$$0.36[14-pKa]-0.52 \geq [r-0.2 \\ q]2 \geq 0.11[14-pKa]-0.28$$

where
r = crystal ionic radius of the cation in Angstroms
q = valence of the cation
pKa = −log of Ka (the equilibrium constant of the following reaction):

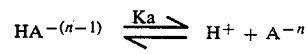

where A is the salt anion and −n is its valence and n is the absolute value.

For example, where A is carbonate, $A^{-n}$ is $CO_3^{-2}$ and the equation is

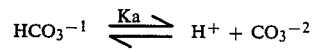

and Ka has a value of $5.6 \times 10^{-11}$ and pKa = 10.25

Crystal ionic radius and pKa values can be found in CRC Handbook of Chemistry and Physics, 67th Ed. published by CRC Press, Inc. (1986), Page F-157 for ionic radius and D-163 for pKa values.

For any given anion (for example carbonate, tetraborate, phosphate, pyrophosphate, sulfate, sulfite, etc.) the cations which define the salts useful in this invention can be determined from the relationship given above. One could in the same manner determine which salts, if any, of a given cation would be effective. Some salts, though not effective themselves, are unstable under the conditions of foam extrusion and decompose to give a salt which is effective and is covered by the above definition. Examples of such salts are bicarbonates, bisulfates, and acid phosphates, which decompose to the corresponding carbonates, sulfates, and pyrophosphates; nitrates, which in the presence of reducing materials such as carbonaceous material or corrosion products are reduced to nitrites; etc.

Each salt has an optimum concentration ranging mainly between 25 and 1000 ppm by weight and generally between 100 and 500 ppm at 0.25 wt. % boron nitride. The optimum is determined experimentally for each specific salt. Some salts like lithium carbonate have narrow optimum ranges, whereas others have significantly broader ranges. Polymers with low melt density, i.e. ethylene copolymers of TFE or CTFE, will normally require higher boron nitride levels (0.5-1.0%) and probably higher salt levels. Polymers of very high dielectric constant may require even higher levels of salts; i.e., 3000 ppm.

The salts useful in this invention can be added as a concentrate (i.e. 0.05-1.0%) to unfilled resin along with the boron nitride concentrate, can be combined with boron nitride in concentrate form or can be blended as a dry salt with boron nitride powder and resin and extruded to give a compounded composition of the desired concentration of salt and boron nitride.

Although salt particle size is not thought to be critical, the smaller the particle the better. Generally the particle size should be below 20 microns and below 5 microns is preferred. Since water is generally detrimental to producing good foam quality, both the boron nitride and salt should be substantially free of moisture. Limited testing with hydrated salts has not given acceptable results.

Although the examples of this patent relate to foamed wire insulation, there are many other potential uses for this technology, including foams used as thermal insulation, cushioning, flotation devices, molded parts, etc.

EXPERIMENTAL DETAILS

Polymers used were copolymers of tetrafluoroethylene/hexafluoropropylene(TFE/HFP), tetrafluoroethylene/perfluoro(propyl vinyl ether) (TFE/PPVE), ethylene/tetrafluoroethylene (ETFE), ethylene/chlorotrifluoroethylene (ECTFE).

Foam nucleation was carried out by a continuous gas injection foaming process using chlorodifluoromethane as the blowing agent and boron nitride as a nucleating agent. Normally the foam constructions described in the following table had a foam void level of 50±5%, controlled by the pressure of the blowing agent. The extruder screw design allows for gas injection and has a Du Pont Saxton mixing torpedo (U.S. Pat. No. 3,006,029) to provide a uniform melt. This mixing torpedo allows the many test combinations of resin cube blends to become a uniform melt mixture after traversing the length of the screw.

Typical conditions used in the Examples that follow are shown in Table I.

TABLE I

| | TFE/HFP | TFE/PPVE | E/TFE | E/TFE | E/CTFE |
|---|---|---|---|---|---|
| Polymer | | | | | |
| Extruder | Davis | Davis | Davis | Entwistle | Entwistle |
| L/D Ratio | 27.8 | 27.8 | 27.8 | 31 | 31 |
| Cross Head | B&H 75 | B&H 75 | Maillefer | Maillefer | Maillefer |
| Type Extrusion | Melt draw | Melt draw | Pressure | Pressure | Pressure |
| Screw Design (Given in mm depth/turns) | | | | | |
| Zone | | | | | |
| Feed | 6.35/10 | 6.35/10 | 3.67/10 | 3.81/10 | 4.06/6 |
| Metering | 1.39/4 | 1.39/4 | 0.86/3.7 | 0.86/3.7 | 0.88/4 |
| Gas | 3.05/4 | 3.05/4 | 3.43/3.25 | 3.42/3.25 | 5.08/3.5 |
| Pumping | 2.15/3.5 | 2.15/3.5 | 1.32/4.25 | 1.32/4.25 | 1.37/6.8 |
| Mixing | 6.35/4 | 6.35/4 | 5.96/2.8 | 5.96/3.5 | 3.94/3.5 |
| (Balance of screw length are transition zones.) | | | | | |
| Temperatures (°C.) | | | | | |
| Rear | 340 | 370 | 315 | 315 | 230 |
| Center Rear | 380 | 390 | 315 | 315 | 260 |
| Center Front | 370 | 380 | 315 | 315 | 270 |
| Front | 375 | 380 | 325 | 325 | 275 |
| Adaptor | 365 | 380 | 300 | 300 | 260 |
| X-head | 300 | 340 | 320 | 320 | 280 |
| Die | 325 | 315 | 330 | 330 | 280 |
| Melt | 385 | 395 | 315 | 315 | 280 |
| Screw Speed (rpm) | 30 | 25 | 20 | 20 | 20 |
| Wire Size (AWG) | 22 | 24 | 24 | 24 | 24 |
| Wire Speed (mpm) | 21 | 43 | 195 | 195 | 22 |
| Wire Preheat (°C.) | 65 | 120 | 200 | 200 | 105 |
| Crosshead Melt Pressure (mPa) | 10.3 | 9.0 | 4.8 | 4.0 | 7.6 |
| Gas Pressure (kPa) | 825 | 825 | 515 | 515 | 690 |
| Vacuum (mm H$_2$O) | 380 | 250 | None | None | None |
| Die (mm) | 4.57 | 4.57 | 0.84 | 0.84 | 1.30 |
| Guide Tip (mm) | 1.90(O.D.) | 2.54(O.D.) | 0.58(I.D.) | 0.58(I.D.) | 0.58(I.D.) |
| Foamed Core Size (mm) | 3.68 | 2.54 | 0.86 | 0.76 | 1.82 |

Since wire speed (see Table II) and cone length (cone length is the distance from the die exit to the point where the molten tubular polymer forms on the wire) (see Table III) both affect foam sell size for TFE/HFP copolymer, they must be controlled within fairly narrow limits. Tight control was used for other polymers as well.

TABLE II

Effect of Wire Speed on Cell Size*

| Wire Speed (m/min) | Avg. Cell Size (micrometer) | Cells/cc |
|---|---|---|
| 4.6 | 500 | $7.6 \times 10^4$ |
| 9.1 | 380 | $1.7 \times 10^5$ |
| 21 | 180 | $1.6 \times 10^6$ |
| 37 | 75 | $2.3 \times 10^7$ |

*RG-62 construction using 0.5% boron nitride in the tetrafluoroethylene/hexafluoropropylene (TFE/HFP) copolymer of Comparative Example 1. Number of cells/cc is calculated from polymer density, average cell size and an assumed void content of 50%. The melt cone length was controlled at 1.9 cm to 2.5 cm.

TABLE III

Effect of Cone Length on Cell Size*

| Cone Length (cm) | Avg. Cell Size (micrometer) | Cells/cc |
|---|---|---|
| 1.9 | 150 | $2.8 \times 10^6$ |
| 7.6 | 200 | $1.2 \times 10^6$ |
| 12.7 | 560 | $5.4 \times 10^4$ |

*RG-62 construction using 0.5% boron nitride in the tetrafluoroethylene/hexafluoropropylene (TFE/HFP) copolymer of Comparative Example 1. Wire speed was about 21 m/min.

Cell size was determined at mid-wall of the foam by visual examination with a microscope or by taking a picture of a thin section of foamed wire insulation at 20-30× magnification and visually determining average cell size. In some examples the number of cells/cc is also given. This value is calculated from the foam void level, usually 50% voids.

Nucleated compositions were generally prepared by cube blending of the resin (melt cut or strand cut) with a boron nitride concentrate prepared by blending boron nitride powder with resin powder and/or cubes and extruding on a 28 mm Werner & Pfleiderer (W&P) twin screw extruder (melt temperature 310°–330° C.) with a strand cutter to pelletize. The salts of this invention were generally added by cube blending a concentrate (usually 0.1% salt by weight) made on the 28 mm W&P extruder, with resin and boron nitride concentrate to give the desired composition. The resulting cube blends were fed directly to the wire coating extruder hopper.

COMPARATIVE EXAMPLE 1

A tetrafluoroethylene/hexafluoropropylene (TFE/HFP) copolymer (12.3 weight percent HFP and melt flow rate of 6.6 at 372° C.; ASTM D-2116-83) was cube blended with a 5 weight percent boron nitride concentrate (SHP-325 grade boron nitride from Carborundum Corporation having a BET surface area of 8.6 sq meters/g, compounded with TFE/HFP copolymer in a 28 mm W&P twin screw extruder as described earlier) in the ratio needed to give products with boron nitride levels from 0.25 to 1.0% by weight. Those compositions were extruded onto wire as described above to give foam compositions of 50% voids with the following results.

| % Boron Nitride | Avg. Cell Size (micrometers)* | | |
|---|---|---|---|
| | Range | Median | Cells/cc |
| 0 | 500–750 | 635 | $3.7 \times 10^4$ |
| 0.25 | 250–430 | 355 | $2.1 \times 10^5$ |
| 0.50 | 115–190 | 150 | $2.8 \times 10^6$ |
| 1.0 | 100–165 | 125 | $4.9 \times 10^6$ |

*These represent the results of a number of individual evaluations.

The spread in values represents the influence of small changes in boron nitride concentration, extrusion condition fluctuations, variations in resin properties (i.e., molecular weight and molecular weight distribution, modifier level, etc.) and cell size determination accuracy.

EXAMPLE 1

The same TFE/HFP copolymer and 5% boron nitride concentrate of Comparative Example 1 were cube blended alone and with a concentrate containing 0.1% calcium tetraborate (from Frank Industries, Columbus, Ohio) at several concentrations. These compositions were extruded onto wire using the Davis extruder as described earlier under Experimental Details in Column 1 of the table. The results are given below and are shown graphically in FIG. I. Parts per million (ppm) in this and all the examples is based on weight of total composition.

| Boron Nitride (%) | Calcium Tetraborate (ppm) | Avg Cell Size (micrometers) |
|---|---|---|
| 0.12 | 0 | 500 |
| 0.12 | 60 | 150 |
| 0.25 | 0 | 360 |
| 0.25 | 70 | 140 |
| 0.25 | 80 | 190 |
| 0.25 | 115 | 125 |
| 0.25 | 120 | 180 |

-continued

| Boron Nitride (%) | Calcium Tetraborate (ppm) | Avg Cell Size (micrometers) |
|---|---|---|
| 0.25 | 125 | 125 |
| 0.25 | 145 | 115 |
| 0.25 | 200 | 150 |
| 0.25 | 540 | 430 |
| 0.50 | 70 | 125 |
| 0.50 | 250 | 150 |
| 0.50 | 400 | 330 |

As shown, the presence of calcium tetraborate gives marked improvement in foam nucleation as evidenced by much reduced cell size compared with the use of boron nitride alone. In addition diameter control and capacitance uniformity were greatly improved over the compositions of Comparative Example 1. It should be noted that there is an optimum concentration of about 150 ppm under the conditions of this evaluation.

When calcium tetraborate was used alone (no boron nitride) at 50 to 1000 ppm the average cell size was 500–750 micrometers.

Thus although calcium tetraborate gives a synergistic effect at low levels with boron nitride, it does not appear to be an effective nucleant by itself under these test conditions.

EXAMPLE 2

In the same fashion as Comparative Example 1 and Example 1 using the TFE/HFP copolymer of Example 1, compositions containing 0.25% boron nitride and several levels of lithium carbonate were prepared and foamed onto wire. The results are given below.

| Lithium Carbonate (ppm) | Avg. Cell Size (micrometer) |
|---|---|
| 0 | 360 |
| 25 | 190 |
| 50 | 125 |
| 75 | 115 |
| 85 | 165 |
| 115 | 125 |
| 140 | 200 |
| 350 | 405 |

All have 0.25% boron nitride. Again there is a very significant improvement in foam nucleation and a fairly sharp concentration optimum, this time at about 50–115 ppm. A composition containing 0.5% lithium carbonate and no boron nitride gave an average cell size of 360 micrometers and the product had an undesirable brownish color.

EXAMPLE 3

Compositions containing 0.25% boron nitride and various levels of sodium tetraborate were prepared and foamed onto wire as in Example 1 using the TFE/HFP copolymer of Example 1. The results are shown below. The diameter of wire coated with foam was nominally 3700 micrometers, and varied as shown in the table.

| Sodium Tetraborate (ppm) | Avg. Cell Size (micrometers) | Foam Core Diameter Variation (micrometers) |
|---|---|---|
| 0 | 360 | ±50 |
| 50 | 220 | ±13 |
| 100 | 230 | ±13 |

| Sodium Tetraborate (ppm) | Avg. Cell Size (micrometers) | Foam Core Diameter Variation (micrometers) |
|---|---|---|
| 200 | 255 | ±25 |
| 400 | 510 | ±50 |

Again there is an optimum concentration (50–100 ppm) to give a significant enhancement in cell nucleation and foam core diameter stability.

EXAMPLE 4

Operating as in Example 1 using the TFE/HFP copolymer of Example 1, compositions containing 0.25% boron nitride and the indicated level of the listed salts (added roughly in proportion to their molecular weights) were extruded onto wire to give foamed constructions with essentially 50% voids with the following results:

| Added Salt | Concentration (ppm) | Avg. Cell Size (micrometers) |
|---|---|---|
| Lithium Carbonate | 88 | 165 |
| Sodium Carbonate | 67 | 200 |
| Sodium Carbonate | 134 | 150 |
| Sodium Tetraborate | 130 | 165 |
| Sodium Tetraborate | 1000 | 610 |
| Sodium Fluorosilicate | 125 | 180 |
| Potassium Tetraborate | 125 | 150 |
| Potassium Pyrophosphate | 200 | 165 |
| Potassium Pyrosulfate | 150 | 140 |
| Potassium Sulfate | 210 | 190 |
| Barium Nitrate | 50 | 675 |
| Barium Nitrate | 100 | 175 |
| Barium Nitrate | 200 | 225 |
| Barium Nitrate | 400 | 250 |
| Calcium Carbonate | 88 | 165 |
| Calcium Tetraborate | 125 | 150 |
| Strontium Carbonate | 94 | 200 |
| Strontium Carbonate | 188 | 200 |
| Aluminum Phosphate | 50 | 325 |
| Aluminum Phosphate | 100 | 200 |
| Aluminum Phosphate | 200 | 200 |
| Sodium Sulfite | 100 | 450 |
| Sodium Sulfite | 200 | 125 |
| Sodium Sulfite | 400 | 250 |

At their optimum concentration these salts, which are representative of the invention, give significant reduction in cell size compared to 0.25% boron nitride alone (typically, 360 micrometer cell size), and in comparison with the salts of Comparative Example 4 which follows.

COMPARATIVE EXAMPLE 4

Using the procedures of Example 4 salts which do not meet the requirements of the claims were added to TFE/HFP copolymer with 0.25% boron nitride and foamed onto wire with the following results:

| Added Salt | Concentration (ppm) | Avg. Cell Size (micrometers) |
|---|---|---|
| Lithium Fluoride | 100 | 305 |
| Lithium Sulfate | 200 | 380 |
| Potassium Chloride | 50 | 560 |
| Potassium Chloride | 100 | 750 |
| Potassium Chloride | 150 | 560 |
| Potassium Chloride | 200 | 500 |
| Magnesium Oxide | 125 | 635 |
| Magnesium Sulfate | 75 | 380 |
| Magnesium Carbonate | 100 | 450 |
| Magnesium Carbonate | 200 | 625 |
| Magnesium Carbonate | 400 | 750 |
| Calcium Oxide | 37 | 355 |
| Calcium Oxide | 100 | 255 |
| Calcium Fluoride | 50 | 380 |
| Barium Sulfate | 100 | 290 |
| Barium Sulfate | 250 | 500 |
| Zinc Borate | 88 | 400 |
| Copper Sulfate | 88 | 320 |
| Copper Sulfate | 250 | 380 |
| Molybdenum Oxide | 100 | 280 |
| Sodium Sulfate | 50 | 350 |
| Sodium Sulfate | 100 | 350 |
| Sodium Sulfate | 400 | 400 |
| Calcium Sulfate | 50 | 425 |
| Calcium Sulfate | 100 | 625 |
| Calcium Sulfate | 200 | 625 |
| Zinc Carbonate | 50 | 500 |
| Zinc Carbonate | 100 | Plugged Probe |
| Iron (III) Phosphate | 50 | 375 |
| Iron (III) Phosphate | 100 | 400 |
| Iron (III) Phosphate | 200 | 400 |

Some salt concentrations undesirably cause molten polymer to enter the orifice of the gas injection probe, preventing entry of the gas. This leads to cessation of the foaming action.

These salts not only do not improve nucleation, but some of them such as magnesium oxide, magnesium carbonate, and potassium chloride gave average cell size much greater than with no salt added.

EXAMPLE 5

A modified ethylene/tetrafluoroethylene (E/TFE) copolymer (20 weight percent ethylene and 4 weight percent perfluorobutyl ethylene and the remainder tetrafluoroethylene, with melt flow rate of 14.0 at 297° C. by ASTM D3159-83 method for type 3 E/TFE copolymer) was cube blended with a boron nitride concentrate made in the twin screw extruder referred to in Comparative Example 1 and containing 10% boron nitride (Carborundum SHP-325) to give a composition with 1% boron nitride (without added salts 2% boron nitride would normally be used). In the same fashion this E/TFE copolymer was also blended with the same ratio of the same boron nitride concentrate plus the appropriate quantity of a concentrate of 0.5% calcium tetraborate to give compositions with varying amounts of calcium tetraborate. All five compositions were extruded onto wire using chlorodifluoromethane as a blowing agent under the conditions shown in the third column of the table under Experimental Details. The results were as follows:

| Calcium Tetraborate (ppm) | Average Cell Size (micrometers) (oval foam cells) |
|---|---|
| 0 | 255 |
| 150 | 150 |
| 300 | 110 |
| 400 | 90 |
| 600 | 150 |

As clearly seen the calcium tetraborate greatly facilitates nucleation with boron nitride.

EXAMPLE 6

The modified E/TFE copolymer of Example 5 was cube blended with the boron nitride concentrate used in Example 5 and with this concentrate plus one containing 0.5% of either lithium carbonate or calcium carbonate. These three compositions were extruded onto wire as in Example 5 with the following results (each sample contained 1.0% boron nitride):

| Salt | Conc. (ppm) | Foam % Voids | Avg. Cell Size (micrometers) | Foam Core Diameter Variation (micrometers) |
|---|---|---|---|---|
| None | 0 | 32 | 70 | ±13 |
| Lithium Carbonate | 225 | 40 | 55 | ±3 |
| Calcium Carbonate | 225 | 34 | 58 | ±6 |

The added salts increase degree of foaming and reduce cell size and diameter variations.

EXAMPLE 7

An ethylene/chlorotrifluoroethylene (E/CTFE) copolymer ("Halar" 500 available from Allied/Ausimont) was cube blended with a concentrate of 5% SHP-325 boron nitride in E/CTFE to give a composition with 0.5% boron nitride. A second composition containing 0.5% boron nitride and also 300 ppm calcium tetraborate was prepared in the same manner using a concentrate of 0.2% calcium tetraborate in Halar 500. These were foamed onto wire (under the conditions of the last column of the table under Experimental Details) with the following results:

| Salt | Conc. (ppm) | % Voids | Avg. Cell Size (Micrometers) |
|---|---|---|---|
| None | — | 33 | 255 |
| Calcium Tetraborate | 300 | 32 | 150 |

EXAMPLE 8

A tetrafluoroethylene/perfluoro(propylvinyl ether) (TFE/PPVE) copolymer (3.5% perfluoro(propyl vinyl ether) and a melt flow rate of 14.7 at 372° C.) (ASTM D3307-86) was blended with a boron nitride concentrate (5% SHP-325 in TFE/PPVE) to give a composition containing 0.5% boron nitride. In a like fashion a composition containing 0.5% boron nitride plus 325 ppm potassium sulfate (using a 0.1% concentrate) was prepared. These were foamed onto wire under the conditions given in the second column of the table under Experimental Details with the following results:

| Potassium Sulfate (ppm) | Avg. Cell Size (micrometers) |
|---|---|
| 0 | 255 |
| 325 | 115 |

EXAMPLE 9

The TFE/HFP copolymer of Example 1 was blended with concentrates containing boron nitride, calcium tetraborate and/or potassium sulfate to give the compositions listed below each containing 0.25% boron nitride. These were foamed onto wire as in Example 1 with the indicated results.

| Calcium Tetraborate (ppm) | Potassium Sulfate (ppm) | Avg. Cell Size (micrometers) |
|---|---|---|
| 0 | 0 | 330 |
| 120 | 0 | 150 |
| 0 | 210 | 190 |
| 120 | 210 | 115 |

Not only do both of these salts enhance nucleation, but when combined they give further improvement.

EXAMPLE 10

The TFE/HFP copolymer of Example 1 was blended with the 5% boron nitride concentrate and with a potassium nitrate concentrate to give the compositions listed below which have two different boron nitride levels. These were foamed onto wire as in Example 1 with the indicated results.

| Boron Nitride (%) | Potassium Nitrate (ppm) | Avg. Cell Size (micrometers) |
|---|---|---|
| 0.25 | 0 | 405 |
| 0.25 | 150 | 345 |
| 0.25 | 350 | 315 |
| 0.25 | 900 | 215 |
| 1.0 | 0 | 165 |
| 1.0 | 150 | 165 |
| 1.0 | 350 | 110 |
| 1.0 | 900 | 75 |

EXAMPLE 11

The TFE/HFP copolymer of Example 1 was blended with 0.5% of a very small particle size/high surface area boron nitride (Union Carbide MW5) and extruded on the 28 mm W&P twin screw extruder referred to earlier. This concentrate was used to produce the foamed compositions listed below:

| Boron Nitride (%) | Potassium Sulfate (ppm) | Average Cell Size (micrometers) |
|---|---|---|
| 0.05 (MW5) | — | 875 |
| 0.05 (MW5) | 500 | 325 |

We claim:
1. A foamable composition comprising a melt-processible fluoropolymer containing a nucleating amount of boron nitride and a synergistic amount of at least one inorganic salt that is thermally stable at the fluoropolymer extrusion temperature, and consists of a metal cation and a polyatomic anion, and satisfies the relationship.

$$0.36 \times [14 - pKa] - 0.52 \geq [r - 0.2\,q]2 \geq 0.11 \times [14 - pKa] - 0.28$$

where
r = crystal ionic radius of the cation, in Angstroms
q = valence of the cation
pKa = −log of Ka for the following reaction

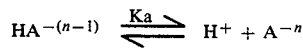

where A is the salt anion, H is hydrogen, and n = the absolute value of the valence of the anion.

2. The composition of claim 1 wherein the boron nitride is present in amount of between 0.02 and 2 weight percent based on weight of composition, and wherein the inorganic salt is present in an amount of between 25 and 3000 parts per million based on weight of composition.

3. The composition of claim 1 or 2 wherein the fluoropolymer contains at least 35 weight percent fluorine, and has a melt flow rate of between 1 and 100 grams per 10 minutes.

4. The composition of claim 1 or 2 wherein the fluoropolymer is selected from the class consisting of
 (a) homopolymers of a monomer selected from the group consisting of chlorotrifluoroethylene and 2,2-difluoroethylene,
 (b) copolymers of tetrafluoroethylene and at least one of the monomers in (a), and
 (c) copolymers of at least one of the monomers in (a) or (b) and one or more monomers selected from the group consisting of ethylene, terminally unsaturated perfluoroalkylene of 3-8 carbon atoms, perfluoro(alkyl vinyl ether) of 3-8 carbon atoms, oxy-containing perfluoro(alkyl vinyl ether) of 5-12 carbon atoms, and perfluoroalkyl ethylene of 3-8 carbon atoms.

5. The composition of claim 4 in which the inorganic salt is one in which the anion is selected from one or more of the class consisting essentially of carbonate, tetraborate, pyrophosphate, pyrosulfate and sulfate.

6. The composition of claim 5 in which the resin is perfluorinated and the salt is at least one salt selected from the class consisting essentially of
 (a) sodium tetraborate,
 (b) potassium tetraborate,
 (c) calcium tetraborate,
 (d) sodium carbonate,
 (e) lithium carbonate, and
 (f) potassium sulfate.

* * * * *

UNITED STATES PATENT AND TRADEMARK OFFICE
CERTIFICATE OF CORRECTION

PATENT NO. : 4,764,538
DATED : August 16, 1988
INVENTOR(S) : Marlin D. Buckmaster et al.

It is certified that error appears in the above-identified patent and that said Letters Patent is hereby corrected as shown below:

Column 2, lines 1 and 2 should read $$-0.36 \times [14-pKa] - 0.52 \geq [r-0.2\,q]^2 \geq 0.11 \times [14-pKa] - 0.28 -\!-.$$

Column 4, lines 14 and 15 should read $$-0.36\,[14 - pKa] - 0.52 \geq [r - 0.2\,q]^2 \geq 0.11\,[14 - pKa] - 0.28 -\!-.$$

Column 12, Claim 1, lines 56 and 57, should read $$-0.36 \times [14-pKa] - 0.52 \geq [r-0.2\,q]^2 \geq 0.11 \times [14-pKa] - 0.28 -\!-.$$

Signed and Sealed this

Thirty-first Day of January, 1989

*Attest:*

DONALD J. QUIGG

*Attesting Officer*     *Commissioner of Patents and Trademarks*